US012582954B1

(12) United States Patent
Hommeltoft et al.

(10) Patent No.: US 12,582,954 B1
(45) Date of Patent: Mar. 24, 2026

(54) PROCESSING FEEDSTOCKS

(71) Applicant: CHEVRON U.S.A. INC., San Ramon, CA (US)

(72) Inventors: Sven Ivar Hommeltoft, Pleasant Hill, CA (US); William Richard Boorujy, Livermore, CA (US)

(73) Assignee: CHEVRON U.S.A. INC., San Ramon, CA (US)

( * ) Notice: Subject to any disclaimer, the term of this patent is extended or adjusted under 35 U.S.C. 154(b) by 0 days.

(21) Appl. No.: 18/980,617

(22) Filed: Dec. 13, 2024

(51) Int. Cl.
| | |
|---|---|
| *B01J 8/26* | (2006.01) |
| *B01J 21/04* | (2006.01) |
| *B01J 23/02* | (2006.01) |
| *B01J 38/02* | (2006.01) |

(52) U.S. Cl.
CPC ................. *B01J 8/26* (2013.01); *B01J 21/04* (2013.01); *B01J 23/02* (2013.01); *B01J 38/02* (2013.01); *B01J 2208/00752* (2013.01); *B01J 2208/00761* (2013.01)

(58) Field of Classification Search
CPC ..... B01J 8/26; B01J 21/04; B01J 23/02; B01J 38/02; B01J 2208/00752; B01J 2208/00761
USPC .......................................................... 422/144
See application file for complete search history.

(56) References Cited

U.S. PATENT DOCUMENTS

| | | |
|---|---|---|
| 2,664,336 A | 12/1953 | Cornell |
| 3,433,733 A | 3/1969 | Bunn, Jr. et al. |

| | | |
|---|---|---|
| 3,784,463 A | 1/1974 | Reynolds et al. |
| 3,894,936 A | 7/1975 | Hartley |
| 4,007,131 A | 2/1977 | Gilespie |
| 4,645,585 A | 2/1987 | White |
| 4,880,574 A | 11/1989 | Welsh |
| 5,145,490 A | 9/1992 | Sadowski |
| 7,998,339 B2 | 8/2011 | Myllyoja et al. |

(Continued)

FOREIGN PATENT DOCUMENTS

| | | |
|---|---|---|
| CN | 102786966 | 11/2012 |
| EP | 2141217 B1 | 3/2015 |

(Continued)

OTHER PUBLICATIONS

Glowka et al., "Sustainable aviation fuel—Comprehensive study on highly selective isomerization route towards HEFA based bioadditives," Renewable Energy 220 (2024), 9 pages.

(Continued)

*Primary Examiner* — Huy Tram Nguyen
(74) *Attorney, Agent, or Firm* — Sheppard, Mullin, Richter & Hampton LLP; Jaime D. Choi

(57) ABSTRACT

Some examples herein provide a method of processing a feedstock. The feedstock may be flowed into a reactor. A catalyst may be flowed into the reactor. Within the reactor, the feedstock may be converted over the catalyst, at an average reaction temperature, to a product stream. The product stream may be withdrawn from the reactor. A stream of the catalyst may be withdrawn from the reactor. Said stream of the catalyst may be heated to a temperature above the average reaction temperature without exposing the catalyst to any air or other oxidants. The heated stream of catalyst may be returned to the reactor at a temperature higher than the reaction temperature, to obtain the average reaction temperature within the reactor.

36 Claims, 6 Drawing Sheets

(56) References Cited

U.S. PATENT DOCUMENTS

| | | | |
|---|---|---|---|
| 8,350,102 | B2 | 1/2013 | Roberts, IV et al. |
| 8,354,065 | B1 * | 1/2013 | Sexton ........................ B01J 8/26 |
| | | | 422/139 |
| 9,580,657 | B2 | 2/2017 | Heydenrych et al. |
| 9,903,584 | B2 | 2/2018 | Fan et al. |
| 10,190,059 | B2 | 1/2019 | Chapus et al. |
| 10,479,943 | B1 | 11/2019 | Liu et al. |
| 10,947,458 | B1 | 3/2021 | Tengfei et al. |
| 11,479,725 | B2 | 10/2022 | Amblard et al. |
| 11,555,153 | B1 | 1/2023 | Hommeltoft |
| 11,912,947 | B1 | 2/2024 | Hommeltoft |
| 12,139,673 | B2 | 11/2024 | Andersson et al. |
| 12,319,878 | B2 | 6/2025 | Hommeltoft |
| 12,319,881 | B1 | 6/2025 | Han et al. |
| 12,421,460 | B2 | 9/2025 | Hommeltoft |
| 12,434,224 | B2 | 10/2025 | Hommeltoft |
| 2007/0161832 | A1 | 7/2007 | Myllyoja et al. |
| 2008/0053870 | A1 | 3/2008 | Marker |
| 2009/0000185 | A1 | 1/2009 | Aulich et al. |
| 2009/0158637 | A1 | 6/2009 | McCall et al. |
| 2009/0300970 | A1 | 12/2009 | Perego |
| 2010/0043278 | A1 | 2/2010 | Brevoord |
| 2010/0163395 | A1 | 7/2010 | Henrich |
| 2011/0021857 | A1 | 1/2011 | Cao |
| 2011/0054230 | A1 | 3/2011 | Cole et al. |
| 2011/0056869 | A1 | 3/2011 | Novak et al. |
| 2011/0196113 | A1 | 8/2011 | Nesterenko |
| 2011/0237853 | A1 | 9/2011 | Hamamatsu et al. |
| 2012/0137572 | A1 | 6/2012 | Bartek et al. |
| 2012/0160741 | A1 | 6/2012 | Gong et al. |
| 2012/0203042 | A1 | 8/2012 | Huber et al. |
| 2012/0238787 | A1 | 9/2012 | Gruber et al. |
| 2012/0244585 | A1 | 9/2012 | Kale et al. |
| 2012/0251424 | A1 | 10/2012 | Havlik et al. |
| 2012/0258021 | A1 | 10/2012 | Badger |
| 2012/0316093 | A1 | 12/2012 | Zhan et al. |
| 2013/0006028 | A1 | 1/2013 | Chaogang et al. |
| 2013/0025187 | A1 | 1/2013 | Kocal et al. |
| 2013/0338409 | A1 | 12/2013 | Trewalla et al. |
| 2014/0012025 | A1 | 1/2014 | Sohling et al. |
| 2014/0109464 | A1 | 4/2014 | Powell et al. |
| 2014/0123973 | A1 | 5/2014 | North |
| 2014/0148609 | A1 | 5/2014 | Roussis et al. |
| 2014/0163285 | A1 | 6/2014 | Buchanan et al. |
| 2014/0171700 | A1 | 6/2014 | Roberts |
| 2015/0051428 | A1 | 2/2015 | Dayton |
| 2015/0087861 | A1 | 3/2015 | Devaux et al. |
| 2015/0141703 | A1 | 5/2015 | Dubois |
| 2018/0170824 | A1 | 6/2018 | Sreekumar |
| 2018/0258349 | A1 | 9/2018 | Heydenrych |
| 2019/0185759 | A1 | 6/2019 | Kanervo et al. |
| 2019/0299195 | A1 | 10/2019 | Nakazawa |
| 2021/0179952 | A1 | 6/2021 | Tsuto et al. |
| 2021/0380885 | A1 | 12/2021 | Mills |
| 2022/0041938 | A1 * | 2/2022 | Hommeltoft .......... C10G 67/02 |
| 2022/0048833 | A1 | 2/2022 | Drobyshev |
| 2022/0049172 | A1 | 2/2022 | Tiitta et al. |
| 2022/0145199 | A1 | 5/2022 | Kuo |
| 2022/0403252 | A1 | 12/2022 | Vilja et al. |
| 2023/0098592 | A1 | 3/2023 | Novak |
| 2024/0157320 | A1 | 5/2024 | Song et al. |
| 2024/0157347 | A1 | 5/2024 | Hommeltoft |
| 2024/0218261 | A1 | 7/2024 | Hommeltoft |
| 2024/0253028 | A1 | 8/2024 | Zhang |
| 2024/0425764 | A1 | 12/2024 | Hommeltoft |
| 2025/0027000 | A1 | 1/2025 | Hommeltoft |
| 2025/0333656 | A1 | 10/2025 | Hommeltoft |

FOREIGN PATENT DOCUMENTS

| | | |
|---|---|---|
| FI | 20205954 A1 | 3/2022 |
| FI | 20225933 A1 | 4/2024 |
| FR | 2991596 A1 | 12/2013 |
| WO | 2008/152199 | 12/2008 |
| WO | 2009/130392 | 10/2009 |
| WO | 2010071677 | 6/2010 |
| WO | 2014/089131 | 6/2014 |
| WO | 2015/148412 | 10/2015 |
| WO | 2023/066738 | 4/2023 |
| WO | 2023088772 | 5/2023 |
| WO | 2024006239 | 1/2024 |

OTHER PUBLICATIONS

Mu et al., "Optimum design of radial flow moving-bed reactors based on a mathematical hydrodynamic model," Chemical Engineering and Processing 42 (2003), pp. 409-417.

Renz, "Ketonization of Carboxylic Acids by Decarbooxylation: Mechanism and Scope," Eur. J. Org. Chem. 2005, 979-988.

Shirzad et al., "Moving Bed Reactors: Challenges and Progress of Experimental and Theoretical Studies in a Century of Research," Ind. Eng. Chem. Res. 58 (2019), pp. 9179-9198.

Huber et al., "Synthesis of Transportation Fuels from Biomass: Chemistry, Catalysts, and Engineering," Chem. Rev. (2006), 106, 4044-4098.

Gibon et al., "Palm oil refining," Eur. J. Lipid. Sci. Technol. 109 (2007), 315-335.

Chen et al., "Catalytic fast pyrolysis of biomass: Selective deoxygenation to balance the quality and yield of bio-oil," Bioresource Technol., 273, pp. 153-158, 2019.

Chen et al., "Recent developments in ignocellulosic biomass catalytic fast pyrolysis: Strategies for the optimization of bio-oil quality and yield," Fuel Process Technol., 196, 106180, 2019.

Han et al., Advancing the application of bio-oils by co-processing with petroleum intermediates: A review, Energy Conversion and Management, 2021.

Liang et al., "Catalytic fast pyrolysis of lignocellulosic biomass: Critical role of zeolite catalysts," Renew. Sust. Energ. Rev., 139, 110707, 2021.

Zabeti et al., "Biodiesel production using alumina-supported calcium-oxide: An optimization study," Fuel Processing Technology 91 (2010) 243-248.

Zhang et al., "Superheated steam as carrier gas and the sole heat source to enhance biomass torrefaction," Bioresource Technology, 2021.

Zhou et al., "Catalytic conversion of lignocellulosic biomass to fine chemicals and fuels," Chem. Soc. Rev. 40, pp. 5588-5617, 2011.

Li et al., "Applications of calcium oxide-based catalyst in biomass pyrolysis/gasification-A review," Journal of Cleaner Production, 291, pp. 1-12, 2021.

Thangadurai et al., "Acidity and basicity of metal oxide based catalysts in catalytic cracking of vegetable oil," Brazilian Journal of Chemical Engineering, 38:1-20, 2021.

* cited by examiner

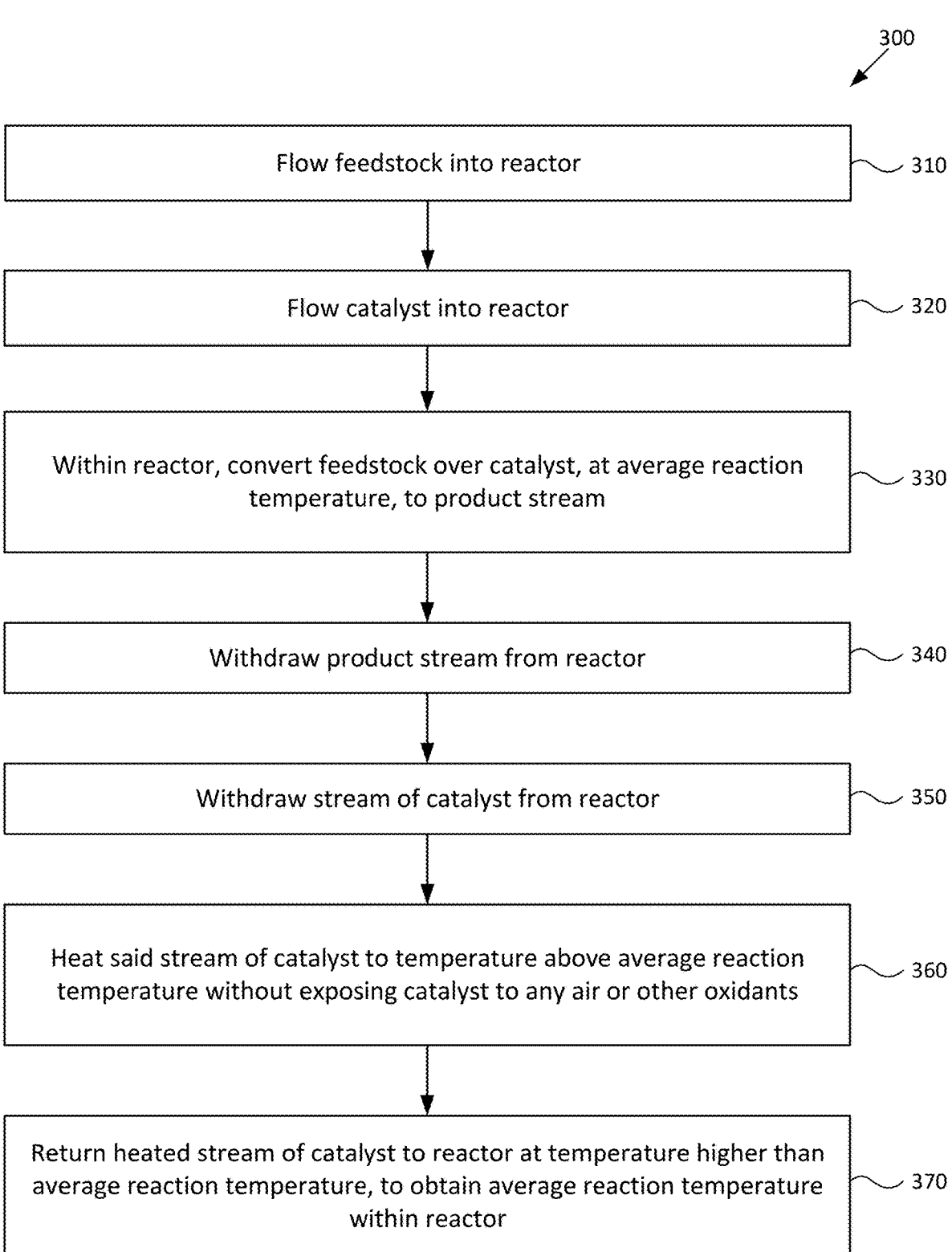

300

| Flow feedstock into reactor | 310 |

| Flow catalyst into reactor | 320 |

| Within reactor, convert feedstock over catalyst, at average reaction temperature, to product stream | 330 |

| Withdraw product stream from reactor | 340 |

| Withdraw stream of catalyst from reactor | 350 |

| Heat said stream of catalyst to temperature above average reaction temperature without exposing catalyst to any air or other oxidants | 360 |

| Return heated stream of catalyst to reactor at temperature higher than average reaction temperature, to obtain average reaction temperature within reactor | 370 |

FIG. 3

PROCESSING FEEDSTOCKS

FIELD

This application generally relates to processing feed- stocks, such as to generate fuels.

BACKGROUND

There is an increasing interest in using lipid feedstocks, such as derived from plants, algae, animals, or microbio- logical organisms, to generate renewable fuels to replace or supplement fossil fuels. However, it can be complicated to generate fuels using feedstocks, such as lipid feedstocks, to generate a product stream.

SUMMARY

Methods and systems for processing feedstocks are pro- vided herein.

Some examples herein provide a method of processing a feedstock. The method may include flowing a feedstock into a reactor. The method may include flowing a catalyst into the reactor. The method may include, within the reactor, con- verting the feedstock over the catalyst, at an average reaction temperature, to a product stream. The method may include withdrawing the product stream from the reactor. The method may include withdrawing a first stream of the catalyst from the reactor. The method may include heating said first stream of the catalyst to a temperature above the average reaction temperature without exposing the catalyst to any air or other oxidants. The method may include returning the heated first stream of catalyst to the reactor at a temperature higher than the average reaction temperature, to obtain the average reaction temperature within the reactor.

In some examples, the catalyst in the reactor is fluidized. In some examples, fluidization in the reactor is achieved by flowing a gas stream up though the catalyst bed.

In some examples, the first stream of catalyst is with- drawn from the reactor into a riser including a wall, and wherein the first stream of catalyst is heated using heat transfer through the wall. In some examples, within the riser, the first stream of catalyst is transported upwards in a stream of inert gas. In some examples, the inert gas includes steam. In some examples, the feedstock is directly injected into the riser.

In some examples, the feedstock is directly injected into the reactor.

In some examples, the first stream of the catalyst is heated using fuel gas. In some examples, the fuel gas includes a portion of the product stream. In some examples, the fuel gas includes a gaseous byproduct of the method.

In some examples, the method further includes maintain- ing activity of the catalyst using operations including: with- drawing a second stream of the catalyst from the reactor; regenerating the catalyst by heating the second stream in the presence of an oxidant to burn off coke from the catalyst; and returning the regenerated catalyst to the reactor. In some examples, regenerating the catalyst generates additional heat that further heats the reactor to the average reaction tem- perature. In some examples, the regenerated catalyst is returned directly to the reactor. In some examples, the regenerated catalyst is returned indirectly to the reactor. In some examples, the oxidant includes air.

In some examples, the feedstock includes a renewable feedstock. In some examples, the renewable feedstock includes a renewable lipid feedstock. In some examples, reaction intermediates are acidic, and the product stream includes an essentially acid-free vapor-phase composition. In some examples, reaction intermediates include fatty acids, carboxylates, or a mixture of fatty acids and carboxy- lates. In some examples, the vapor-phase intermediate com- position has a total acid number (TAN) of less than about 5. In some examples, the vapor-phase composition includes organic oxygenates including ketone groups. In some examples, more than about 70 wt % of the organic oxygen- ates include ketone groups. In some examples, more than about 70 wt % of the organic oxygenates in a boiling range of 20-500° C. include ketone groups.

In some examples, reaction intermediates are sorbed to the catalyst via one or more of adsorption, chemisorption, and absorption.

In some examples, the catalyst includes a metal oxide catalyst on an oxide support. In some examples, the metal oxide catalyst includes at least one metal selected from the group consisting of Na, K, Mg, Ca, and Sr. In some examples, the metal oxide catalyst includes calcium oxide. In some examples, the oxide support includes alumina.

Some examples herein provide a system for processing a feedstock. The system may include a reactor. The system may include piping configured to flow a feedstock into the reactor. The system may include piping configured to flow a catalyst to the reactor to convert the feedstock over the catalyst, within the reactor, at an average reaction tempera- ture, to a product stream. The system may include piping configured to withdraw the product stream from the reactor. The system may include piping configured to withdraw a first stream of the catalyst from the reactor. The system may include a heater configured to heat said first stream of the catalyst to a temperature above the average reaction tem- perature without exposing the catalyst to any air or other oxidants. The system may include piping configured to return the heated first stream of catalyst to the reactor at a temperature higher than the average reaction temperature, to obtain the average reaction temperature within the reactor.

In some examples, the catalyst in the reactor is fluidized. In some examples, fluidization in the reactor is achieved by flowing a gas or vapor stream up though the catalyst bed.

In some examples, the system includes a riser including a wall, wherein piping withdraws the first stream of catalyst from the reactor into the riser, and wherein the heater heats the first stream of catalyst using heat transfer through the wall. In some examples, within the riser, the first stream of catalyst is transported upwards in a stream of inert gas. In some examples, the inert gas includes steam. In some examples, the feedstock is directly injected into the riser.

In some examples, the feedstock is directly injected into the reactor.

In some examples, the heater uses fuel gas to heat the first stream of the catalyst. In some examples, the fuel gas includes a portion of the product stream. In some examples, the fuel gas includes a gaseous byproduct of the method.

In some examples, the system further includes piping configured to withdraw a second stream of the catalyst from the reactor; a regenerator configured to maintain activity of the catalyst by regenerating the catalyst by heating the second stream in the presence of an oxidant to burn off coke from the catalyst; and piping configured to return the regen- erated catalyst to the reactor. In some examples, regenerat- ing the catalyst generates additional heat that further heats the reactor to the average reaction temperature. In some examples, the system includes piping to return the regener- ated catalyst directly to the reactor. In some examples, the regenerated catalyst is returned indirectly to the reactor. In some examples, the oxidant includes air.

In some examples, the feedstock includes a renewable feedstock. In some examples, the renewable feedstock includes a renewable lipid feedstock. In some examples, reaction intermediates are acidic, and the product stream includes an essentially acid-free vapor-phase composition. In some examples, reaction intermediates include fatty acids, carboxylates, or a mixture of fatty acids and carboxylates. In some examples, the vapor-phase intermediate composition has a total acid number (TAN) of less than about 5. In some examples, the vapor-phase composition includes organic oxygenates including ketone groups. In some examples, more than about 70 wt % of the organic oxygenates include ketone groups. In some examples, more than about 70 wt % of the organic oxygenates in a boiling range of 20-500° C. include ketone groups.

In some examples, reaction intermediates are sorbed to the catalyst via one or more of adsorption, chemisorption, and absorption.

In some examples, the catalyst includes a metal oxide catalyst on an oxide support. In some examples, the metal oxide catalyst includes at least one metal selected from the group consisting of Na, K, Mg, Ca, and Sr. In some examples, the metal oxide catalyst includes calcium oxide. In some examples, the oxide support includes alumina.

BRIEF DESCRIPTION OF DRAWINGS

FIG. 3 illustrates an example flow of operations in a method for processing a feedstock.

DETAILED DESCRIPTION

Figure 1:
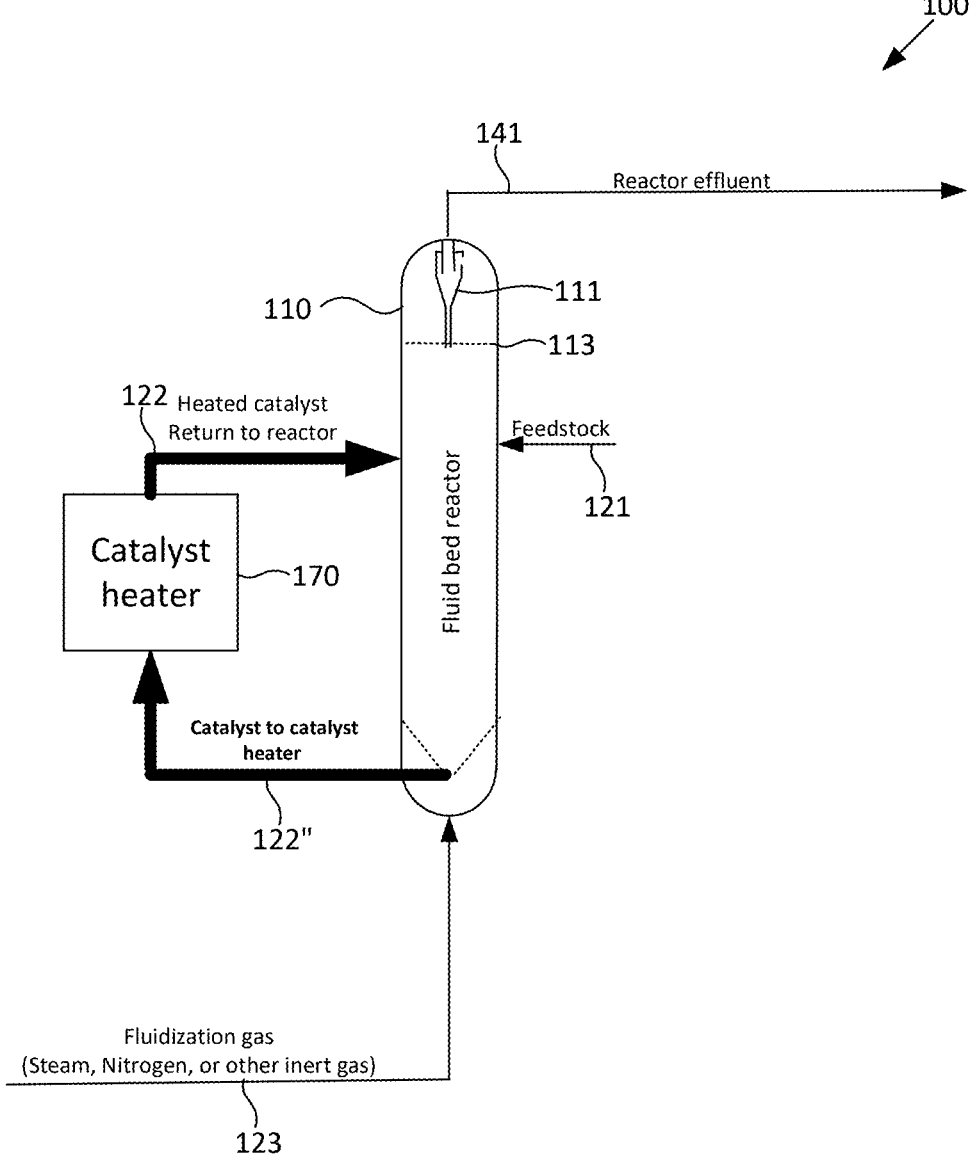
FIG. 1 schematically illustrates an example system for generating a product stream using a feedstock.

As provided herein, when reacting a feedstock over a catalyst within a reactor, it may be useful to inject additional heat to the catalyst and feedstock before they enter the reactor, e.g., so that they are at a temperature which is above the average reaction temperature needed to sufficiently react the feedstock within the reactor to generate a product stream. This additional heat then drives the reactions within the reactor, without necessarily needing to heat the reactor itself to maintain the average reaction temperature. That is, the reactor then may be run adiabatically. This can simplify the reactor design, and reduce operation costs, relative to a reactor which needs to be actively heated, in order to maintain the average reaction temperature needed to sufficiently react the feedstock within the reactor to generate the product stream. Additionally, or alternatively, introducing heat to the reactor by heating the catalyst recycle means the feed need not be heated to as high a temperature (if at all), which for temperature sensitive feedstocks such as lipids offers several advantages including less heater fouling.

A variety of renewable lipid feedstocks may be used to generate renewable fuels, such as sustainable aviation fuel (SAF) or renewable diesel. In some examples provided herein, because lipid feedstocks are chemically complex, it is useful to provide sufficient residence time between the lipid feedstock and catalyst to generate reaction intermediates which sorb to the catalyst, and which combine to form a gas-phase intermediate composition which may, in some examples, be further processed into a renewable fuel, such as SAF, renewable diesel, naphtha, or gasoline. Another portion of the partially exhausted catalyst may be regenerated and recycled back into the reactor. While such regeneration generates heat, because only a portion of the catalyst is being regenerated, the heat thus generated may be insufficient to bring the reactor to the average reaction temperature needed to sufficiently react the feedstock within the reactor. As provided herein, in this example circumstance, it similarly may be useful to inject additional heat to the catalyst and/or feedstock before they enter the reactor, so that the reactor may be run adiabatically.

First, some example terms will be explained. Then, non-limiting examples of the present methods and systems will be described.

Example Terms

As used herein, the term "about" is intended to mean within 10% of the stated value.

As used herein, the term "primarily" is intended to mean a majority, e.g., at least half. Illustratively, an element (such as a product stream or composition) which primarily has components with boiling point above a certain level, means that at least half of the element is made up of components with boiling point about that level. The term "primarily" encompasses all ranges from at least a half to 100%, e.g., 51% or more, about 60% or more, about 70% or more, about 80% or more, about 90% or more, or about 95% or more, or about 98% of more, or about 99% or more, or about 100%.

As used herein, the term "substantially" is intended to mean significantly. Illustratively, a concentration of a component within a first element (such as a product stream or composition) which is substantially less than the concentration of that component within a second element, means that the concentration of that component within the first element is less than about 20% of the concentration within the second element, e.g., less than about 10%, less than about 5%, less than 1%, or even less. As another example, a reaction that is performed using substantially only certain components means that of all the components which are present at the reaction, at least about 80%, at least about 90%, at least about 95%, at least about 98%, at least about 99%, or about 100% are the certain components.

As used herein, the term "lipid" is intended to refer to a fatty acid; glyceride (e.g., monoglyceride or diglyceride); glycerolipid (e.g., triglyceride, also referred to as triacylglycerol, TAG, or neutral fat); phospholipid; or phosphoglyceride (also known as glycerophospholipid).

As used herein, the term "fatty acid" is intended to refer to a monocarboxylic acid having an aliphatic chain containing about 3 to 39 carbon atoms, illustratively about 7 to 23 carbon atoms. The aliphatic chain may be linear or branched, and may be saturated (e.g., may contain no carbon-carbon double bonds) or may be unsaturated (e.g., may contain one or more carbon-carbon double bonds).

As used herein, a "lipid feedstock" is intended to refer to a composition which is derived from a biological source, rather than from a fossil fuel source such as crude oil, shale oil, or coal, and primarily contains lipids. For example, a lipid feedstock may contain more than 50 wt % lipids, may contain more than 70 wt % lipids, may contain more than 85 wt % lipids, may contain more than 90 wt % lipids, may contain more than 95 wt % lipids, or more. A lipid feedstock may be derived from a plant, algae, animal, or microbiological organism. In some examples, a lipid feedstock may be derived from a low value waste material, side stream, by-product, residue, or sewage sludge. A lipid feedstock may be pretreated in a manner such as known in the art, for example, may be degummed, neutralized, bleached, and/or deodorized.

Depending on the source and the pretreatment (if any), a lipid feedstock may contain a mixture of different lipids. Illustratively, a lipid feedstock may include about 0-90 weight percent (wt %) of free fatty acids, about 5-100 wt % of fatty acid glycerol esters (e.g., monoglycerides, diglycerides, and/or triglycerides), and about 0-20 wt % of one or more compounds selected from the group consisting of: fatty acid esters of the non-glycerol type, fatty amides, and fatty alcohols. In some examples, the lipid feedstock may include more than about 50 wt % of free fatty acids and fatty acid glycerol esters, e.g., more than about 70 wt % of free fatty acids and fatty acid glycerol esters, or more than about 80 wt % of free fatty acids and fatty acid glycerol esters. The concentration of free fatty acids in a lipid feedstock may be characterized by determining the total acid number (TAN) of the feedstock, by measuring the mass of potassium hydroxide (KOH) in milligrams that is required to neutralize one gram of the lipid feedstock; see also ASTM D664. In some examples, a lipid feedstock may have a TAN of at least about 5 mg KOH/g, e.g., about 5-150 mg KOH/g, or about 10-150 mg KOH/g, or about 10-100 mg KOH/g, or about 10-50 mg KOH/g, or about 10-25 mg KOH/g, or about 10-20 mg KOH/g. A lipid feedstock may contain one or more impurities, such as phosphorous, silicon, chloride, an alkali metal such as sodium or potassium, an alkaline earth metal such as magnesium or calcium, a metal such as manganese or iron, or the like.

As used herein, the terms "renewable fuel intermediate composition" and "intermediate composition" are intended to refer to a liquid product that is produced from a lipid feedstock using a thermochemical process. In some examples, the intermediate compositions provided herein may include less than about 70 wt % of an amount of oxygen in the lipid feedstock. An intermediate composition may include oxygenated hydrocarbons (also called organic oxygenates) such as carboxylic acids, alcohols, ketones, aldehydes, and the like. In some examples, about 10 wt % to 50 wt % of the molecules of a liquid portion of the intermediate composition includes oxygen, and about 50 wt % or more of the molecules of the liquid portion of the intermediate composition do not include oxygen. In some examples, at least about 70 wt %, or at least about 80 wt %, of the oxygen in the liquid portion of the intermediate composition is within ketone groups. For example, more than about 70 wt % of the organic oxygenates may include ketone groups. In some examples, more than about 70 wt % of the organic oxygenates in a boiling range of 20-500° C. may include ketone groups. In some examples, an intermediate composition may be further processed to generate a renewable fuel.

As used herein, the term "pyrolysis" is intended to refer to the thermal decomposition of organic materials in an oxygen-lean atmosphere (that is, an atmosphere containing significantly less oxygen than required for complete combustion).

As used herein, the term "hydroprocessing" is intended to refer to a process in which a composition (such as a lipid feedstock or an intermediate composition) is reacted with hydrogen in the presence of a catalyst under suitable conditions, e.g., elevated temperature and/or elevated pressure. Nonlimiting examples of hydroprocessing include hydrogenation, double bond saturation, hydrodeoxygenation, hydrocracking, hydro-isomerization, hydrodesulfurization, hydrodenitrogenation, hydrodearomatization, hydrodewaxing, and mild hydrocracking.

As used herein, the term "transportation fuel" refers to a fraction, cut, or blend of hydrocarbons having a distillation curve which is standardized for a particular fuel used in the transportation industry. For example, diesel fuel corresponds to a middle distillate from 160° C. to 380° C. (according to EN 590). As another example, aviation fuel corresponds to a distillate from 160° C. to 300° C. (according to ASTM D-1655). Gasoline and naphtha are other standardized, well-characterized forms of transportation fuels. When a transportation fuel is derived from a lipid feedstock (e.g., via an intermediate composition in a manner such as provided herein), then the transportation fuel may be referred to herein as a "renewable fuel." When a fuel (such as a transportation fuel, e.g., renewable fuel) is ready for use without substantial further processing, it may be referred to herein as a "final product." The final product may be conveyed to a site of use in any suitable manner, e.g., by pipeline, truck, and/or rail.

As used herein, the term "ppm" is intended to refer to parts-per-million and is a weight-relative parameter. A ppm is a microgram per gram, such that a component that is present at 10 ppm in a composition is present at 10 micrograms of the component per 1 gram of the composition.

Processing Feedstocks to Generate Product Streams

The present systems and methods, nonlimiting examples of which will now be described, may be used to react feedstocks over catalysts to generate product streams. In some examples, the present systems and methods may be used to convert lipid feedstocks into renewable fuel intermediate compositions, which in some examples may be further processed for conversion into fuel, e.g., transportation fuel such as diesel fuel, aviation fuel, naphtha, and/or gasoline. While the present systems and methods may in some cases be described in the context of converting lipid feedstocks to renewable fuel intermediate compositions, it will be appreciated that the present systems and methods are not so limited, and may be used to process any suitable feedstock to generate a suitable product stream.

FIG. 1 illustrates an example system 100 that includes reactor 110 and catalyst heater 170. Additional nonlimiting example configurations of system 100 are described with reference to FIGS. 2A-2D.

In the example illustrated in FIG. 1, a stream of feedstock is injected directly into reactor 110 via piping 121. A stream of catalyst flows through piping 122" from reactor 110 to catalyst heater 170, which heats the catalyst before piping 122 returns a stream of the heated catalyst to reactor 110. Reactions may be performed within reactor 110, and optionally also may be performed within catalyst heater 170 and the piping coupling the heater to reactor 110. Such reactions may be performed, for example, using reaction intermediates which are sorbed to the catalyst as that catalyst is transported multiple times through reactor 110, catalyst heater 170, and the piping. That is, in the example shown in FIG. 1, at least recycled catalyst and fluidization gas 123 are flowed through catalyst heater 170, optionally together with feedstock and/or reaction intermediates which are withdrawn from reactor 110 together with the stream of the catalyst.

In nonlimiting examples such as illustrated in FIG. 1, the feedstock and the particulate catalyst may be input into reactor 110 independently from one another (e.g., via respective piping) and mixed with one another within reactor 110. In other nonlimiting examples such as described with reference to FIG. 2A, the feedstock and particulate catalyst may be mixed with one another either inside or outside of a riser to form a mixture that is then input into reactor 110. In still other examples such as illustrated in FIG. 1, and described with reference to FIGS. 2B, 2C, and 2D, the feedstock may be directly injected into reactor 110, rather than injected into a riser. In some examples, such as described with reference to FIGS. 2B and 2C, a first stream of the catalyst may be recycled from the reactor into a riser and then back to the riser. Additionally, or alternatively, as illustrated in FIG. 1 and as described with reference to FIG. 2D, a riser may be omitted and a first stream of the catalyst may be heated using a catalyst heater and from there injected directly into the reactor 110.

A fluidization gas or stripping/fluidization gas (e.g., steam, nitrogen, or other inert gas) may be input to the reactor and/or riser (if used), e.g., via suitable piping. The fluidization gas or stripping/fluidization gas may promote fluidization within the reactor 110. Additionally, in examples where the fluidization gas or stripping/fluidization gas is steam, the steam may inhibit cracking and coke formation. In some examples, the steam is provided in an amount of about 0 wt % to about 50 wt %, and its use is optional. Some examples use substantially only steam (or other inert gas) and the feedstock as inputs to system 100 for reactions which are catalyzed by the particulate catalyst (which catalyst may be recycled in the system in a manner such as described herein). That is, hydrogen may not be separately input to the system. Additionally, the fluidization gas or stripping/fluidization gas may not be a reactant in the reactions between the feedstock and the particulate catalyst, e.g., may not be a source of hydrogen for such reactions.

In some examples, reactor 110 illustrated in FIGS. 1 and 2A-2D may be or include a fluidized bed reactor. Within at least the reactor 110 (and in examples including riser 230, optionally also within the riser), the feedstock reacts over the particulate catalyst. In nonlimiting examples in which the feedstock is or includes a renewable lipid feedstock, the particulate catalyst may (i) generate acidic reaction intermediates of the renewable lipid feedstock that are sorbed to the particulate catalyst and (ii) promote reactions of the acidic reaction intermediates to generate a vapor-phase intermediate composition which is essentially acid free. In some examples, the vapor-phase intermediate composition has a total acid number (TAN) of about 5 mg KOH/g or less, e.g., a TAN of about 1 mg KOH/g or less, e.g., a TAN of about 0.5 mg KOH/g or less. Lowering the TAN of the vapor-phase intermediate composition is helpful because it simplifies the steps and equipment needed to convert the vapor-phase intermediate composition into a renewable fuel.

As the mixture flows through the reactor 110, the feedstock undergoes reactions promoted by the catalyst to generate reactor effluent, including a product stream, which is output by suitable piping 141. As such, the particular concentrations of the feedstock, any reaction intermediates, and the product(s) of such reactions being generated may vary along reactor 110 as the catalyst promotes the reactions to generate a product stream. Illustratively, in nonlimiting examples in which the feedstock is or includes a renewable lipid feedstock, particular concentrations of the lipid feedstock, the acidic reaction intermediates, and the vapor-phase intermediate composition may vary along reactor 110 as the catalyst promotes the reactions. Because the intermediate composition is in the vapor phase, the intermediate composition desorbs from the particulate catalyst and is carried through riser 230 (if used) and reactor 110. The vapor-phase intermediate composition may carry the particulate catalyst, at least some of which has acidic reaction intermediates sorbed thereto, through and out of riser 230 (if used) and at least partially through reactor 110. Additionally, or alternatively, steam or other non-reactive fluidization gas or stripping/fluidization gas may be used to carry the particulate catalyst, at least some of which has acidic reaction intermediates sorbed thereto, through and out of reactor 110. However, it will be appreciated that the present systems and methods are not limited to performing reactions of lipid feedstocks to generate acidic reaction intermediates and vapor-phase intermediate compositions, and indeed may be used to form any suitable product stream.

In some examples, the system may be configured so as to promote additional reactions, such as of reaction intermediates, to generate additional product beyond that generated during only a single pass of the particulate catalyst through the reactor 110. For example, piping may couple reactor 110 to either to a catalyst heater 170 or to a riser 230 and may be configured to flow a first portion of the particulate catalyst, to which reaction intermediates (such as acidic reaction intermediates) are sorbed, from the reactor to the catalyst heater or riser, and then back to the reactor. Accordingly, reactions which are not complete after a single pass through the reactor 110 may continue to proceed on the next pass through the reactor, as well as on subsequent passes through the reactor as a portion of the particulate catalyst is repeatedly cycled through the reactor a plurality of times while the reaction intermediates are sorbed thereto.

The reactor 110 further may be configured to disengage the product stream (e.g., vapor-phase intermediate composition) from the particulate catalyst and to output the reactor effluent, including the product stream, via piping 141.

In some examples, a regenerator optionally may be used and configured to regenerate a second portion of the particulate catalyst (e.g., a portion of the particulate catalyst which is not flowed to the catalyst heater 170 or to riser 230 via piping 122"). For example, as illustrated in FIGS. 2A, 2B, 2C, and 2D, the system optionally may include piping 240 to feed a second portion of the particulate catalyst from reactor 110 to an input of regenerator 220, and piping 122 may be used to feed regenerated catalyst from an output of regenerator 220 either into riser 230 (FIGS. 2A and 2B) or into reactor 110 (FIGS. 2C and 2D). Note that the used catalyst need not be fully exhausted, e.g., may be only partially exhausted, by the reactions within reactor 110 before being regenerated using regenerator 220. For example, the second portion particulate catalyst may still have acidic reaction intermediates sorbed thereto, and those reaction intermediates may be removed from the particulate catalyst within a stripping section 212 of reactor 110 before the catalyst is flowed to regenerator 220 via piping 240. Piping 122 may be used to recycle the regenerated particulate catalyst into contact with additional feedstock (e.g., additional renewable lipid feedstock) in the reactor and/or riser (if used). As such, fresh particulate catalyst need not always (or ever) be input to reactor 110, and instead the particulate catalyst optionally may be or include regenerated catalyst from regenerator 220 in addition to recycled catalyst from reactor 110.

The process of regenerating the catalyst using regenerator 220 is exothermic, and the internal heat generated thereby may be used to promote the reactions within reactor 110 that generate the reaction intermediates (e.g., acidic reaction intermediates, in nonlimiting examples in which the feedstock is or includes a renewable lipid feedstock) and the product stream (e.g., intermediate composition, in nonlimiting examples in which the feedstock is or includes a renewable lipid feedstock). In some examples, system 100 may include an external heater configured to input additional heat that promotes the reactions within reactor 110, e.g., beyond the heat generated by regenerating the particulate catalyst. In a manner such as described illustrated in FIGS. 2A-2C, the external heat optionally may be input to the system using riser 230. However, it will be appreciated that any suitable heat source, or combination of heat sources, may be used to promote the reactions within reactor 110. For example, in a manner such as FIGS. 1 and 2D, a catalyst heater 170 may be used to heat catalyst which is withdrawn from reactor 110 and then returned to the reactor after heating.

Without wishing to be bound by any theory, it is believed that the conversion of lipid feedstock to a vapor-phase intermediate composition using a particulate catalyst may involve multiple chemical operations, e.g., at least three chemical operations. In some examples, the chemical operations to convert a lipid feedstock to a vapor-phase intermediate composition using a particulate catalyst may include initial cracking of the lipid feedstock, using the particulate catalyst, to form fatty acids. Additionally, in some examples, the chemical operations may include sorption of the fatty acids to the surface of the particulate catalyst. Nonlimiting examples of sorption processes of the fatty acids (and/or other reaction intermediates) include adsorption, chemisorption, and absorption. Illustratively, at least some of the fatty acids may chemisorb to the particulate catalyst via formation of carboxylate bonds using surface-bound hydroxyl groups of the particulate, for example in a manner such as illustrated below:

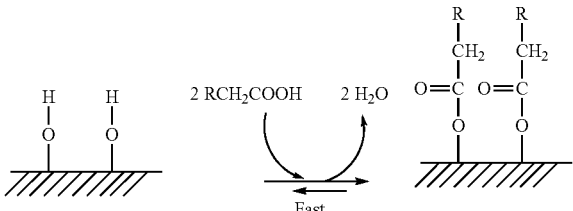

Fast

The fatty acids may undergo further chemical reactions after being sorbed to the catalyst. As such, the catalyst may have sorbed thereto various acidic reaction intermediates such as fatty acids, carboxylates, or a mixture of fatty acids and carboxylates. Illustratively, the chemical operations may include coupling of the sorbed fatty acids to one another on the surface of the particulate catalyst to form dimeric ketones which are vapor-phase molecules. Without wishing to be bound by any theory, it is believed that the sorption of fatty acids to the surface of the particulate catalyst and the chemical conversion of the fatty acids to form ketones affects the acidity and TAN of the intermediate composition. In some examples, the chemical operations may include desorption of the dimeric ketones from the particulate catalyst and into the vapor phase.

-continued

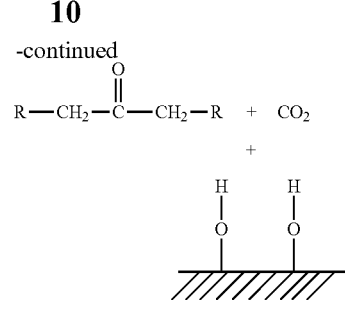

$R-CH_2-C-CH_2-R$ + $CO_2$

Additionally, in some examples, the chemical operations may include cracking of the vapor-phase ketones, using the particulate catalyst, into vapor-phase lighter products. Accordingly, the intermediate composition may include vapor-phase ketones, vapor-phase lighter products generated by cracking vapor-phase ketones, or a mixture of such vapor-phase ketones and vapor-phase lighter products. In some examples, more than about 70 wt % of oxygen in the vapor-phase intermediate composition is in the ketone groups. In some examples, the vapor-phase intermediate composition may include organic oxygenates including ketone groups. In some examples, more than about 70 wt % of the organic oxygenates comprise ketone groups. In some examples, more than about 70 wt % of the organic oxygenates in a boiling range of about 20-500° C. include ketone groups.

As provided herein, and as now will be further explained with reference to FIGS. 2A-2D, heating the particulate catalyst and/or feedstock outside of the reactor may introduce sufficient heat to the system to promote reactions of the feedstock to generate a product stream.

Figure 2A:
FIGS. 2A-2D schematically additional example systems for processing a feedstock.
Figure 2A:
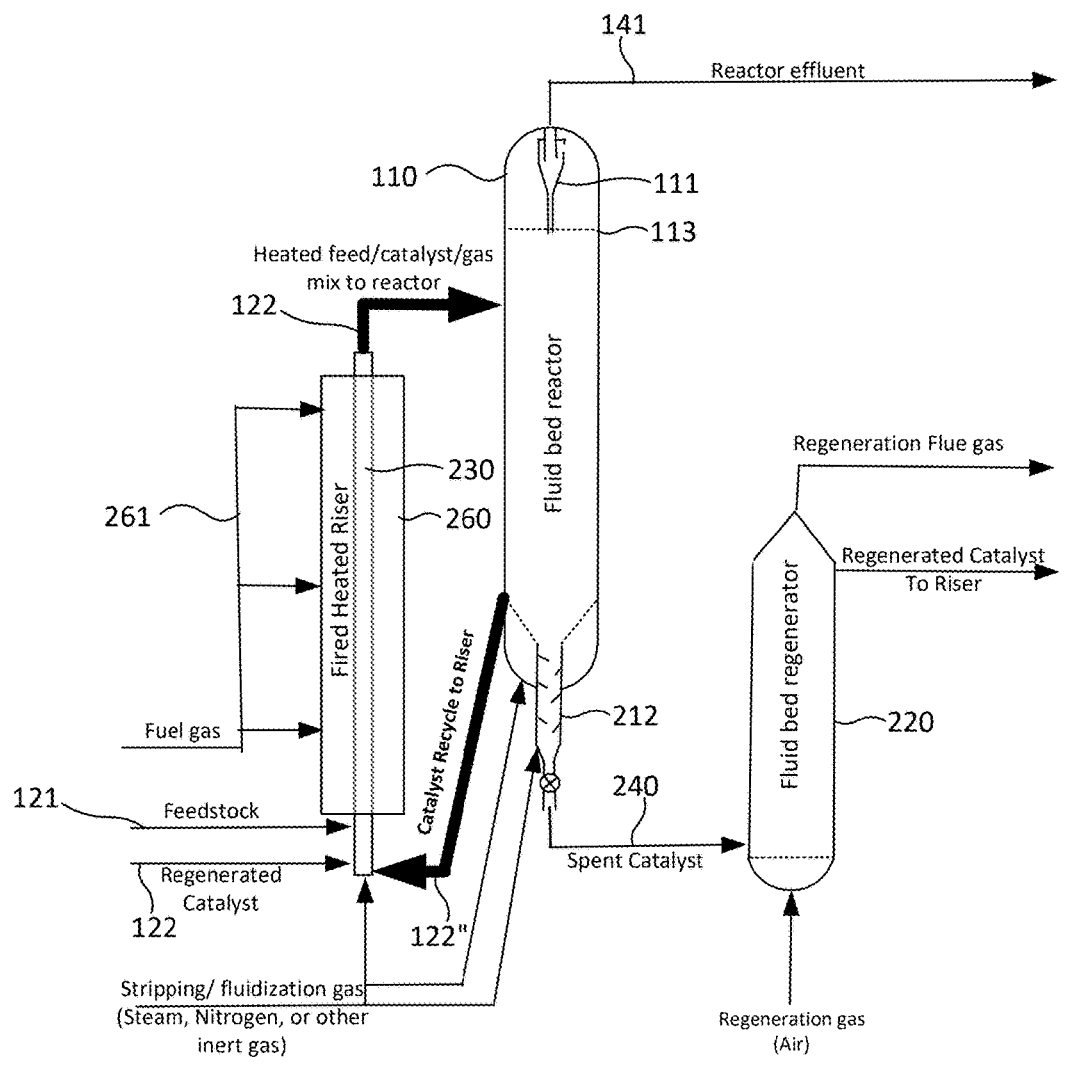

FIG. 2A schematically illustrates an example system 200A for adiabatically processing a feedstock, such as (but not limited to) a renewable feedstock. In this nonlimiting example, system 200A includes reactor 110 (e.g., a fluidized bed reactor) and regenerator 220 which are coupled to one another using a riser 230, and catalyst standpipe 240. In nonlimiting examples in which a riser 230 is used and is located next to reactor 110, this may be referred to as a "side-by-side" configuration, but it will be appreciated that other configurations suitably may be used (including those that omit riser 230).

In the nonlimiting example shown in FIG. 2A, a mixture of feedstock, a first stream of catalyst from reactor 110, and a second stream of catalyst from regenerator 220, are input to riser 230 and transported in the vapor phase through riser 230 to reactor 110. Optionally, the mixture is lifted through the riser by a stripping/fluidization gas (e.g., steam, nitrogen, or other inert gas). Alternatively, in other examples such as illustrated in FIGS. 1, FIGS. 2B, 2C, and 2D, the feedstock and/or catalyst may be injected directly into reactor 110.

At least within reactor 110 (and optionally also within riser 230, in examples that include the riser), the catalyst promotes reactions of the feedstock to form a product stream. In some examples, the reactions are performed in the gas phase. Illustratively, the catalyst may crack the feedstock into smaller vapor-phase molecules, such as linear alkanes, branched alkanes, cycloalkanes, and branched alkenes. The smaller vapor-phase molecules then may further crack and/or combine to form still smaller linear alkenes and branched alkenes which are in the vapor phase, and which may be suitably captured and optionally condensed for use as fuel, e.g., transportation fuel, or as a feedstock for another process. In other examples, reaction intermediates sorb to the catalyst and react there to form additional reaction intermediates and eventually a product stream, that may be in the vapor phase, illustratively such as described with reference to FIG. 1.

Reactor 110 (e.g., fluidized bed reactor) includes cyclone(s) 111 to separate partially exhausted catalyst from the products of the reactions, forming reactor effluent which includes the product stream and is output from the reactor by suitable piping. As the partially exhausted catalyst flows downward through the reactor 110 under the force of gravity and/or gas flow, the reactor 110 may strip hydrocarbons and/or residual reaction intermediates (if any) off a second stream of the catalyst, for example using steam and stripping trays 212. Following stripping, catalyst standpipe 240 returns the partially exhausted catalyst to regenerator 220. As shown in FIG. 2A, regeneration gas (e.g., air) may be injected into regenerator 220. Regenerator 220 may burn off coke, which is formed in riser 230, from the catalyst in a stream of air while heating the catalyst. This generates heat. The regenerated catalyst, together with the heat generated in the regenerator 220, then may flow into riser 230 for reuse. The heat from the regenerated catalyst may promote reactions of the feedstock, at least within reactor 110 (and optionally also within riser 230, in examples that include the riser).

In certain, nonlimiting examples, a renewable lipid feedstock and particulate catalyst (from regenerator 220 and piping 122") are input to riser 230 (FIG. 2A example) where they form a mixture that flows through riser 230 to reactor 110. Within riser 230 and reactor 110, the particulate catalyst (i) generates acidic reaction intermediates of the renewable lipid feedstock that are sorbed to the particulate catalyst and (ii) promotes reactions of the acidic reaction intermediates to generate a vapor-phase intermediate composition which is essentially acid free. Nonlimiting examples of such reactions are described above with reference to FIG. 1. In other examples (FIGS. 2B-2D) the mixture in riser 230 does not include a separate flow of the feedstock, because the feedstock is directly injected into the reactor 110, and in some such examples (FIG. 2D) riser 230 optionally may be omitted.

In the nonlimiting example schematically illustrated in FIG. 2A, piping 122" may be used to couple an outlet of reactor 110 to an inlet of riser 230, via which the first stream of the particulate catalyst, optionally with reaction intermediates sorbed thereto, may be flowed from reactor 110 to riser 230. The first stream then may flow again through the riser 230 and reactor 110, from which some of that stream may flow through piping 122" back to the riser, and so on. At least some of the particles of the particulate catalyst may flow through the riser 230, reactor 110, and piping 122" multiple times before being stripped within stripping section 212 (e.g., using stripping trays) and then flowing to regenerator 220 to be regenerated. In this regard, the mixture of feedstock and particulate catalyst within riser 230, reactor 110, and piping 122" may contain a range of different "ages" of particulate catalyst, that is, particles of the particulate catalyst that have been cycled through the riser, reactor, and piping different numbers of times than one another, and thus optionally have different types of reaction intermediates sorbed thereto.

In some examples, reactor 110 (whether of system 200A or other system described herein) optionally may include a fluidized bed of additional catalyst which partially fills reactor 110 above section 212, e.g., having an upper level in the region denoted 113. The catalyst within reactor 110 may be in addition to (and indeed, may be substantially greater in volume than) the catalyst which enters the reactor 110 via riser 230 during operation. That is, reactor 110 optionally may be pre-charged with additional inventory catalyst (illustratively, to approximately an upper level in the region denoted 113) before startup, so as to maintain approximately that amount of the catalyst within the reactor 110 during operation, even while the inflow of catalyst to reactor 110 is approximately equal to the outflow of catalyst from reactor 110. In other examples, e.g., in which the reactions complete relatively quickly, the desired products may be separated from the catalyst immediately after exiting the riser, and the catalyst immediately regenerated and used, without the need to include additional inventory catalyst within reactor.

Referring again to FIG. 2A, at least within reactor 110 (and optionally also within other system component(s), such as riser 230) the particulate catalyst may promote reactions of the feedstock. In non-limiting examples in which the feedstock is or includes a renewable lipid feedstock, the particulate catalyst may promote reactions of acidic reaction components sorbed thereto to form intermediate composition, e.g., over the course of minutes. In some examples, system 200A is configured such that the acidic reaction intermediates are sorbed to the particulate catalyst for an average residence time of more than about one minute, e.g., more than about 2 minutes, more than about 3 minutes, more than about 4 minutes, or more than about 5 minutes. Illustratively, the average residence time may be about 6 minutes to about 16 minutes.

Figure 2B:
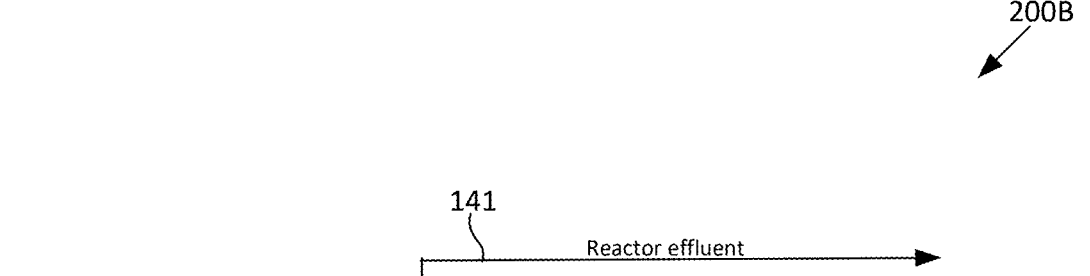
Figure 2B:
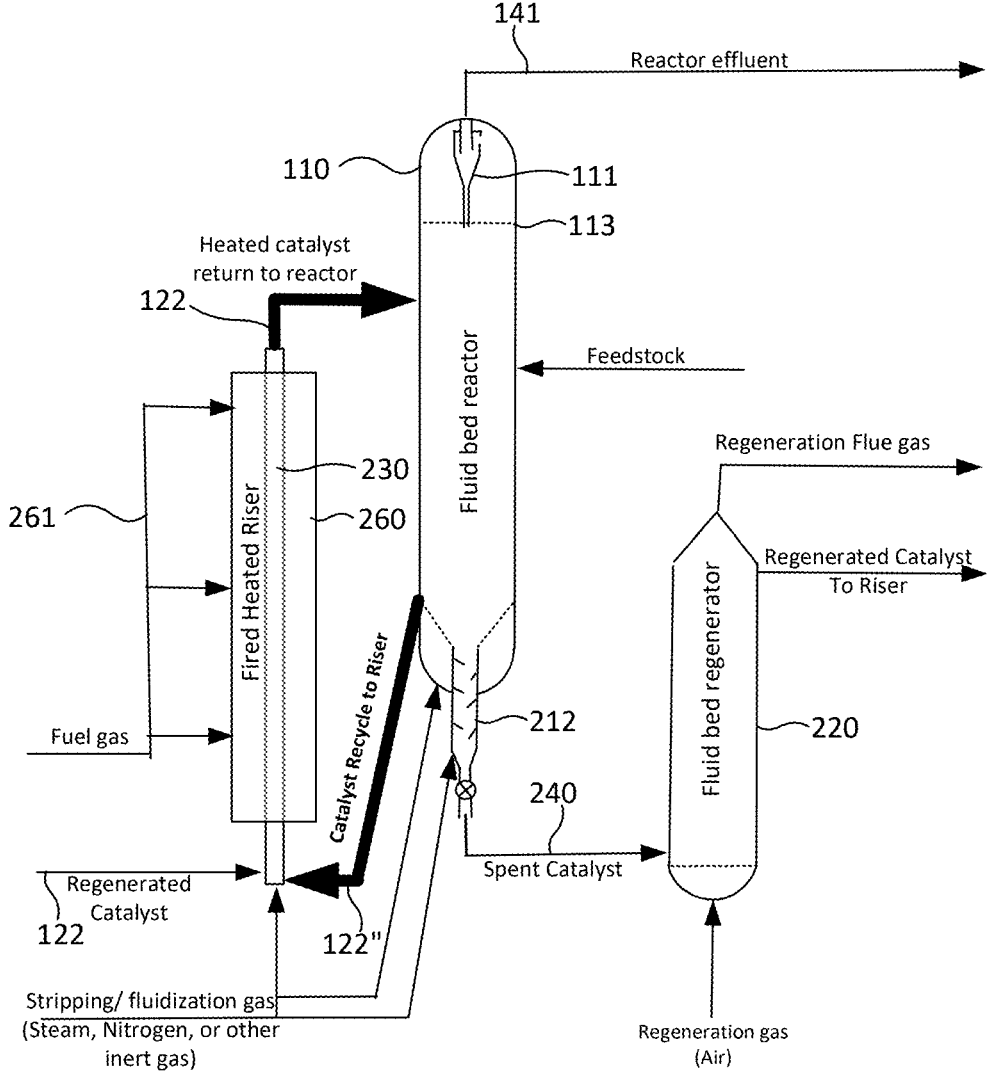
Figure 2C:
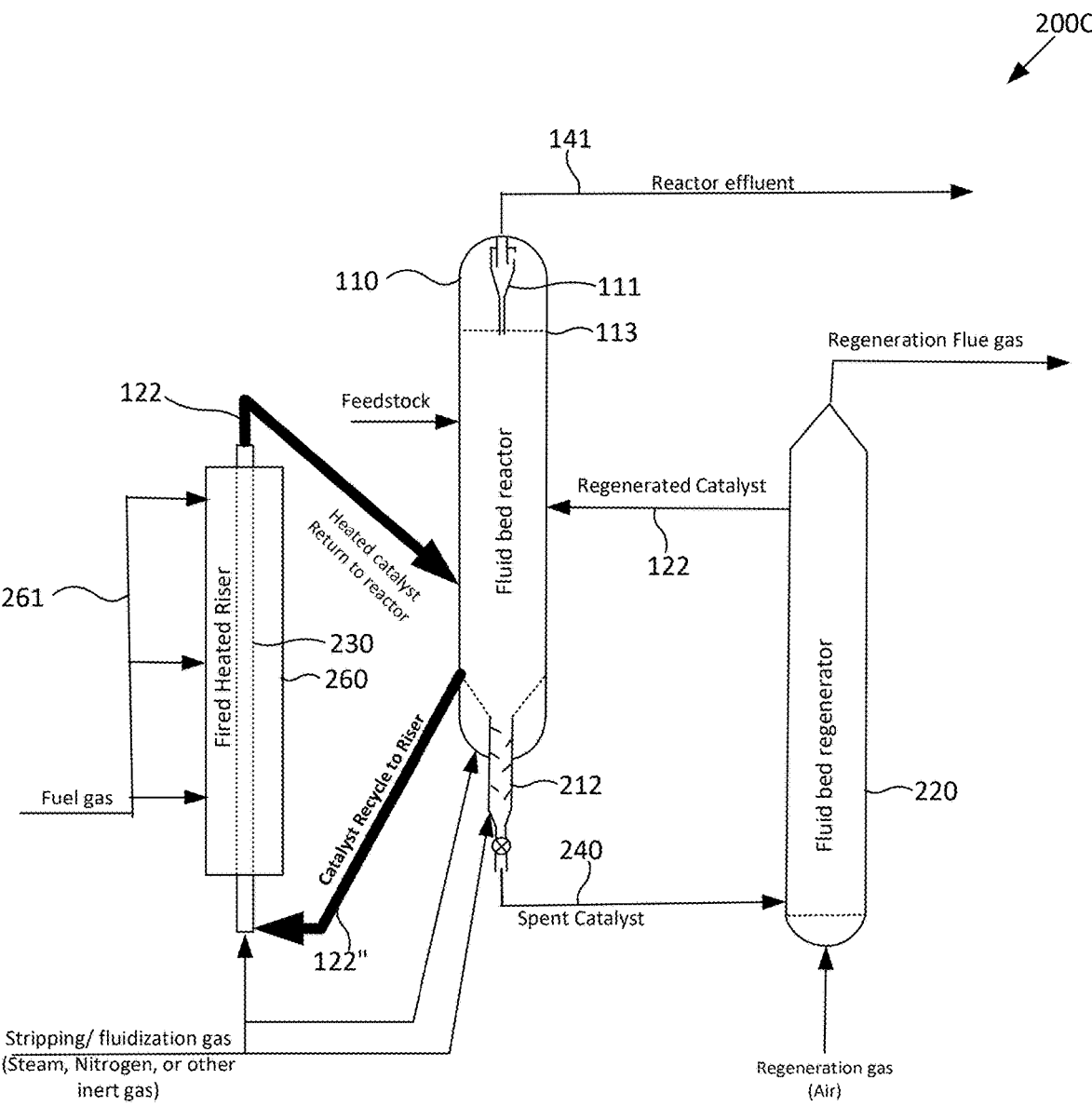
Figure 2D:
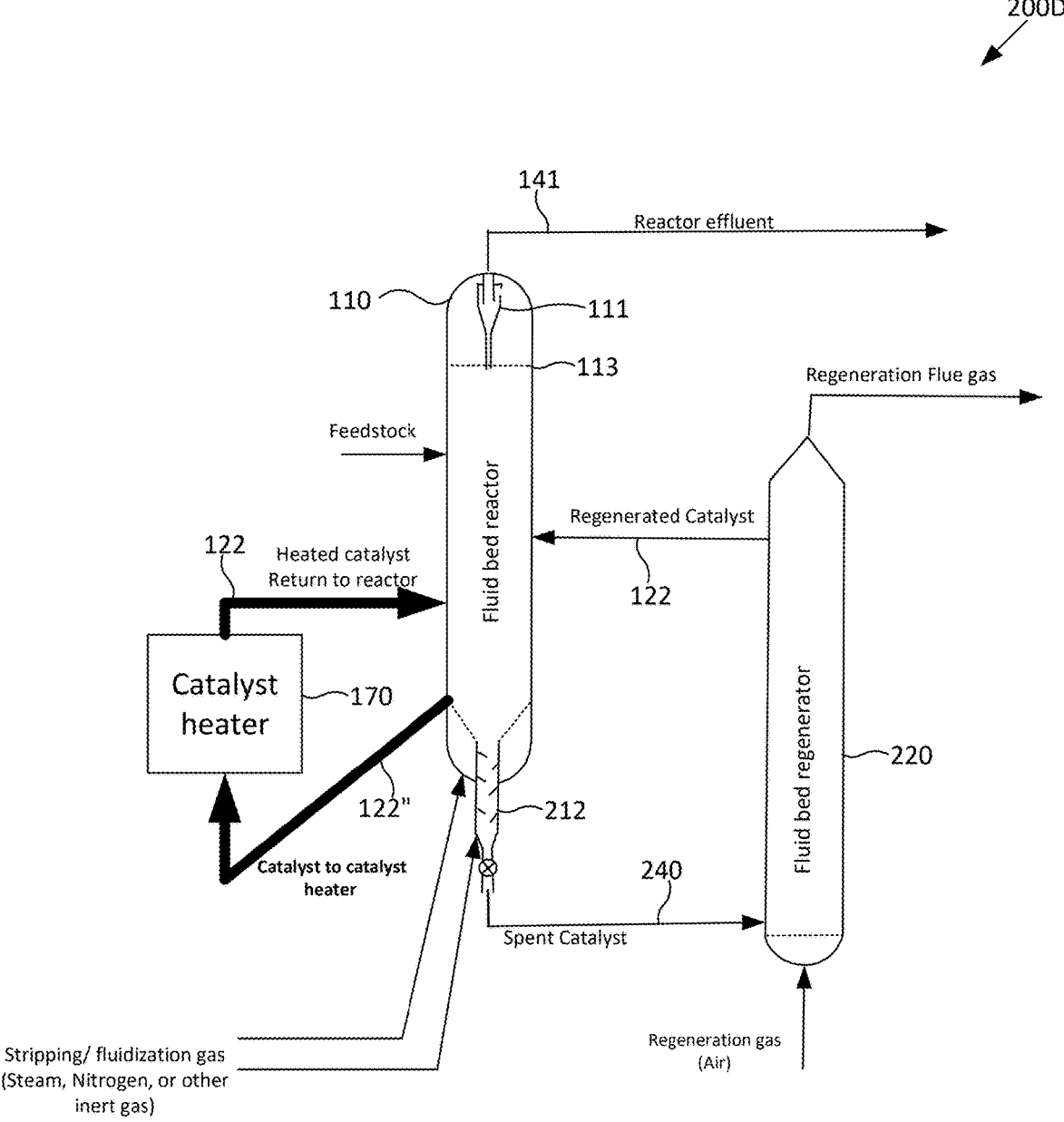

In certain non-limiting examples in which the feedstock is or includes a renewable lipid feedstock such as described above with reference to FIG. 1, reactions of the acidic reaction components (promoted by the particulate catalyst) generate the intermediate composition, which is in the vapor phase. Adding heat to the reactants outside of reactor 110 promotes such reactions, and allows reactor 110 to be run adiabatically if desired. In nonlimiting examples such as illustrated in FIGS. 2A-2C, riser 230 is heated to add heat to the mixture of the feedstock and catalyst therein. In other examples such as illustrated in FIGS. 1 and 2D, a stream of the catalyst may be removed from reactor 110, heated using a catalyst heater, and then returned to the heater.

The product stream (which in some examples includes renewable fuel intermediate composition) may be separated from the particulate catalyst in any suitable manner, for example using cyclone(s) 111 within reactor 110.

Referring again to FIG. 2A, the second stream of the particulate catalyst flows downward through the reactor 110 under the force of gravity and/or gas flow. The reactor 110 may strip residual hydrocarbon off the catalyst, for example using steam and stripping trays 212. Catalyst standpipe 240 returns the stripped catalyst to regenerator 220. As shown in FIG. 2A, regeneration gas (e.g., air) may be injected upward into regenerator 220. Regenerator 220 may burn off coke, which is formed as a result of the reactions the catalyst promotes, from the catalyst in a stream of air while heating the catalyst. The regenerated catalyst then may flow into riser 230 for reuse.

The reactions within regenerator 220 are exothermic, and the regenerated particulate catalyst carries with it heat that promotes reactions of the lipid feedstock and reaction intermediates thereof to form the intermediate composition. Depending on the amount of catalyst that is directed to the regenerator 220 (the balance of the catalyst being directed from the regenerator to the riser 230 in examples such as shown in FIGS. 2A-2B, or directed from the regenerator to the reactor 110 in examples such as shown in FIGS. 2C-2D), the amount of heat that is generated by the regenerator may not be sufficient to promote reactions of the feedstock to form the desired composition, and/or may not necessarily be sufficient to maximize the yield of such reactions. Accordingly, in some examples, the reactions may be promoted using a combination of (i) internal heat generated by regenerating the particulate catalyst of the second stream, and (ii) external heat that is input to system 200A. In the nonlimiting example illustrated in FIG. 2A, the external heat is input to system 200A using riser 230. For example, riser 230 may be at least partially surrounded by a heater (e.g., heating jacket) 260 that is configured to transfer external heat into riser 230. Any suitable source of heat may be used, such as a fuel gas. For example, in the nonlimiting configuration illustrated in FIG. 2A, fuel gas is transported via piping 261 to heater (e.g., heating jacket) 260 where the fuel gas is burned to generate heat and the heat is transferred into riser 230 to promote the reactions. In one nonlimiting example, the fuel gas is or includes a portion of the reactor effluent (e.g., a portion of the vapor-phase intermediate composition) However, it will be appreciated that the external heat may be input to the system in any suitable location and in any suitable manner.

For example, FIG. 2B illustrates an example system 200B which may be configured similarly as system 200A, e.g., that includes reactor 110, regenerator 220, and riser 230 with heater 260 which are coupled to one another in the manner described with reference to FIG. 2A, e.g., using catalyst standpipe 240 and piping 122''. However, in the nonlimiting example illustrated in FIG. 2B, the feedstock may be injected directly into reactor 110 instead of into riser 230. In a manner such as described with reference to FIG. 2A, reactions may be performed within reactor 110, and optionally also may be performed within riser 230 and piping 122'', for example using reaction intermediates which are sorbed to the catalyst as that catalyst is transported multiple times through riser 230 and piping 122''. That is, in the example shown in FIG. 2B, at least recycled catalyst and stripping/fluidization gas are flowed through riser 230, optionally together with feedstock and/or reaction intermediates which are withdrawn from reactor 110 together with the first stream of the catalyst. The second stream of catalyst is flowed to regenerator 220 for regeneration, similarly as described with reference to FIG. 2A.

As another example, FIG. 2C illustrates an example system 200C which may be configured similarly as systems 200A and 200B, e.g., that includes reactor 110, regenerator 220, and riser 230 with heater 260 which are coupled to one another in the manner described with reference to FIGS. 2A and 2B, e.g., using catalyst standpipe 240 and piping 122''. However, in the nonlimiting example illustrated in FIG. 2C, both the feedstock and the regenerated catalyst may be injected directly into reactor 110 instead of into riser 230. In a manner such as described with reference to FIGS. 2A and 2B, reactions may be performed within reactor 110, and optionally also may be performed within riser 230 and piping 122'', for example using reaction intermediates which are sorbed to the catalyst as that catalyst is transported multiple times through riser 230 and piping 122''. That is, in the example shown in FIG. 2C, at least recycled catalyst and stripping/fluidization gas are flowed through riser 230, optionally together with feedstock and/or reaction intermediates which are withdrawn from reactor 110 together with the first stream of the catalyst. The second stream of catalyst is flowed to regenerator 220 for regeneration, similarly as described with reference to FIG. 2A. In system 200C, however, the regenerated catalyst then is flowed directly back into reactor 110 rather than into riser 230 as in the example shown in FIGS. 2A-2B.

As yet another example, FIG. 2D illustrates an example system 200D which may be configured similarly as system 200C, e.g., that includes reactor 110 and regenerator 220 which are coupled to one another in the manner described with reference to FIG. 2C, e.g., using catalyst standpipe 240 and piping 122'', with both the feedstock and the regenerated catalyst injected directly into reactor 110. In example system 200D, riser 230 is omitted. The first stream of catalyst flows through piping from reactor 110 to catalyst heater 170, which heats the catalyst before piping returns the heated catalyst to reactor 110. In a manner such as described with reference to FIGS. 2A and 2B, reactions may be performed within reactor 110, and optionally also may be performed within catalyst heater 170 and piping coupling the heater to reactor 110, for example using reaction intermediates which are sorbed to the catalyst as that catalyst is transported multiple times through catalyst heater 170 and the piping. That is, in the example shown in FIG. 2D, at least recycled catalyst and stripping/fluidization gas are flowed through catalyst heater 170, optionally together with feedstock and/or reaction intermediates which are withdrawn from reactor 110 together with the first stream of the catalyst. The second stream of catalyst is flowed to regenerator 220 for regeneration, similarly as described with reference to FIG. 2A. Similarly as in system 200C, the regenerated catalyst then is flowed directly back into reactor 110.

While various examples described herein make reference to components such as risers and/or catalyst regenerators, it will be appreciated that such features are entirely optional and that the present systems and methods may be used to provide heat to catalytic reactors in any suitable manner.

FIG. 3 illustrates an example flow of operations in a method 300 for processing a feedstock. Method 300 includes flowing a feedstock into a reactor (operation 310). In some examples, the feedstock is or includes a renewable feedstock (e.g., renewable lipid feedstock), though any suitable feedstock may be used. In nonlimiting examples such as described with reference to FIG. 2A, the feedstock may be directly injected into a riser, and may be flowed into the reactor via the riser. Alternatively, in nonlimiting examples such as described with reference to FIGS. 1 and 2B-2D, the feedstock may be injected directly into the reactor.

Method 300 includes flowing a catalyst into the reactor (operation 320). In nonlimiting examples such as described with reference to FIGS. 2A, 2B, and 2C, at least a portion of the catalyst (illustratively, at least a first stream of the catalyst obtained from the reactor using piping 122'') may be flowed into the reactor via a riser. In other examples, such as described with reference to FIGS. 1 and 2D at least a portion of the catalyst may be flowed into the reactor from a catalyst heater that is configured to heat the at least a portion of the catalyst. In nonlimiting examples such as described with reference to FIGS. 2A, 2B, 2C, and 2D, an additional portion of the catalyst (illustratively, a second stream of the catalyst obtained from the regenerator) also may be flowed into the reactor either via the riser (FIGS. 2A, 2B) or may be injected directly into the reactor (FIGS. 2C and 2D).

In some examples, the catalyst may be or include a particulate catalyst. The particulate catalyst may include any suitable metal oxide catalyst on an oxide support. In some examples, the metal oxide catalyst includes at least one metal selected from the group consisting of Na, K, Mg, Ca, Sr, and a rare earth metal. Illustratively, the metal oxide catalyst may include at least one metal selected from the group consisting of Na, K, Ca, and Mg. In some examples, the metal of the metal oxide catalyst may be an alkali metal such as lithium, sodium, or potassium. In some examples, the metal of the metal oxide catalyst may be an alkaline earth metal such as magnesium, strontium, or calcium. In one nonlimiting example, the metal oxide catalyst may include calcium oxide, and in some examples may consist essentially of calcium oxide, or may consist of calcium oxide. The calcium within the calcium oxide catalyst may be in oxidation state 2 (as in CaO), but it may be in any suitable chemical form and is not limited to exclusively CaO. Additionally, the chemistry of the calcium oxide catalyst may change over time and/or with exposure to the lipid feedstock. For example, the calcium oxide catalyst initially may be in the form of CaO, CaO(OH), or $Ca(OH)_2$, or a mixture thereof. In operation, the calcium may be in the form of a mixture of any such compounds and/or in the form of carbonate or carboxylate. Additionally, or alternatively, the calcium may become partially embedded in the oxide support as aluminate, e.g., oxy-aluminate and/or hydroxy-aluminates. The metal oxide catalyst may be supported on any suitable oxide support, such as alumina. In some examples, the lipid feedstock is mixed with substantially no other solid-state materials besides the metal oxide catalyst (e.g., calcium oxide catalyst or other alkaline earth metal oxide catalyst) on the oxide support (e.g., alumina).

In some examples, the particulate catalyst, e.g., metal oxide catalyst on the oxide support, includes particles with sizes in the range of about 0.01 mm to about 5 mm. Illustratively, the particulate catalyst may include (or in some cases may consist essentially of) particles with sizes in the range of about 0.05 mm to about 0.15 mm, or may include (or in some cases may consist essentially of) particles with sizes in the range of about 0.05 mm to about 0.15 mm.

The particulate catalyst, e.g., metal oxide catalyst on the oxide support, additionally, or alternatively, may have any suitable combination of properties, e.g., bulk density, particle density, packed density, pore volume, large pore content, average pore diameter, and/or surface area. Illustratively, the metal oxide catalyst may have one or more of the following properties, or any suitable combination of two or more of the following properties: a bulk density in the range of about 0.78 kg/l to about 0.86 kg/l; a particle density in the range of about 1.2 kg/l to about 1.4 kg/l; a packed density in the range of about 0.8 g/cc to about 1.0 g/cc; a pore volume in the range of about 0.42 to about 0.48 cc/g; a large pore content (pores >1000 Å) of about 0.30 cc/g to about 0.38 cc/g; an average pore diameter (D50) of about 100 Å to about 200 Å; and/or a surface area of about 50 $m^2$/g to about 300 $m^2$/g. Additionally, or alternatively, the metal oxide catalyst may have one or more of the following properties, or any suitable combination of two or more of the following properties: a bulk density in the range of about 0.80 kg/l to about 0.84 kg/l; a particle density in the range of about 1.1 kg/l to about 1.3 kg/l; a packed density in the range of about 0.85 g/cc to about 0.95 g/cc; a pore volume in the range of about 0.44 to about 0.46 cc/g; a large pore content (pores >1000 Å) of about 0.33 cc/g to about 0.36 cc/g; an average pore diameter (D50) of about 130 Å to about 160 Å; and/or a surface area of about 80 $m^2$/g to about 120 $m^2$/g.

In some examples, the catalyst and feedstock may be mixed with steam to inhibit cracking and coke formation. In some examples, the steam is provided in an amount of about 0 wt % to about 50 wt %, and its use is optional. In some examples, the reactants include substantially only steam, the feedstock (e.g., renewable lipid feedstock), and the catalyst. That is, hydrogen may not be separately input as a reactant. Additionally, the steam may not be a reactant in the reactions between the feedstock and the catalyst, e.g., may not be a source of hydrogen for such reactions.

Referring still to FIG. 3, method 300 includes, within the reactor, converting the feedstock over the catalyst, at an average reaction temperature, to a product stream (operation 330). In some examples, the catalyst in the reactor is fluidized. Optionally, fluidization in the reactor may be achieved by flowing a gas or vapor stream up though the catalyst bed (e.g., fluidization gas or stripping/fluidization gas). Nonlimiting examples of reactions to convert a feedstock over a catalyst to a product stream are provided elsewhere herein.

Method 300 includes withdrawing the product stream from the reactor (operation 340). For example, in a manner such as described with reference to FIGS. 1 and 2A-2D, a cyclone 111 within the reactor 110 may remove effluent from the reactor, and the reactor effluent may be output by suitable piping 141. The effluent may include the product stream. In nonlimiting examples in which the feedstock is, or includes, a renewable lipid feedstock, the product stream may include an intermediate composition.

Method 300 includes withdrawing a stream of the catalyst from the reactor (operation 350). For example, in a manner such as described with reference to FIGS. 1 and 2D, piping 122" may withdraw a stream of the catalyst from the reactor to catalyst heater 170. Or, for example, in a manner such as described with reference to FIGS. 2A-2C, piping 122" may withdraw a first stream of the catalyst from the reactor to riser 230.

Method 300 includes heating said stream of the catalyst to a temperature above the average reaction temperature without exposing the catalyst to any air or other oxidants (operation 360). In some examples, the heating uses fuel gas to heat the first stream of the catalyst. Illustratively, catalyst heater 170 described with reference to FIGS. 1 and 2D, or heater 260 of riser 230 described with reference to FIGS. 2A-2C, may burn such fuel gas to generate heat. Optionally, the fuel gas may include a portion of the product stream, or may include a gaseous byproduct from the reactor or other component of the system or method. In nonlimiting examples such as described with reference to FIGS. 2A-2C, the first stream of catalyst may be withdrawn from the reactor into a riser including a wall, and the first stream of catalyst is heated using heat transfer through the wall, e.g., heat generated by heater 260. Optionally, within the riser, the first stream of catalyst is transported upwards in a stream of inert gas (such as steam), e.g., as described with reference to FIGS. 2A-2C. In other examples, such as described with reference to FIGS. 1 and 2D, the riser 230 may be omitted, and any other suitable heater 170 may be used to heat catalyst withdrawn from the reactor before the heated catalyst is returned to the reactor.

Method 300 includes returning the heated stream of catalyst to the reactor at a temperature higher than the average reaction temperature, to obtain the average reaction temperature within the reactor (operation 370).

In some examples, method 300 optionally includes maintaining activity of the catalyst using operations that include withdrawing a second stream of the catalyst from the reactor; regenerating the catalyst by heating the second stream in the presence of an oxidant (such as air) to burn off coke from the catalyst; and returning the regenerated catalyst to the reactor. For example, in a manner such as described with reference to FIGS. 2A-2D, the regenerator may be used to regenerate the second stream of the catalyst. The regenerated catalyst may be returned indirectly to the reactor, e.g., may be injected into a riser carrying the first stream of catalyst withdrawn from the reactor, in a manner such as described with reference to FIGS. 2A-2B. Alternatively, the regenerated catalyst may be returned directly to the reactor in a manner such as described with reference to FIGS. 2C-2D. In any such examples, regenerating the catalyst optionally generates additional heat that further heats the reactor to the average reaction temperature. However, it will be appreciated that regenerating the catalyst is optional and may be omitted, e.g., in a manner such as described with reference to FIG. 1.

In nonlimiting examples in which the renewable feedstock includes a renewable lipid feedstock, the reaction intermediates may be acidic, and the product stream may include an essentially acid-free vapor-phase composition. The reaction intermediates may, for example, include fatty acids, carboxylates, or a mixture of fatty acids and carboxylates. The vapor-phase intermediate composition may in some examples have a total acid number (TAN) of less than about 5. The vapor-phase composition may include ketone groups. In some examples, more than about 70 wt % of oxygen in the vapor-phase composition is in the ketone groups.

In some examples, reaction intermediates are sorbed to the catalyst for an average residence time of about 6 minutes to about 16 minutes. Additionally, or alternatively, reaction intermediates are sorbed to the catalyst via one or more of adsorption, chemisorption, and absorption.

In some examples, the catalyst comprises a metal oxide catalyst on an oxide support. The metal oxide catalyst may include at least one metal selected from the group consisting of Na, K, Mg, Ca, and Sr. In some nonlimiting examples, the metal oxide catalyst includes calcium oxide. In some nonlimiting examples, the oxide support comprises alumina.

In examples in which the feedstock is or includes a renewable lipid feedstock, the method further may include, within the riser and/or the reactor and/or piping 122", using the particulate catalyst to (i) generate acidic reaction intermediates of the renewable lipid feedstock that are sorbed to the particulate catalyst and (ii) promote reactions of the acidic reaction intermediates to generate a vapor-phase intermediate composition which is essentially acid free. The particulate catalyst may be heated to any suitable temperature, at any suitable location(s) outside of the reactor, to provide an average reaction temperature within the reactor to generate the intermediate composition. In various examples, the catalyst may be heated outside of the reactor to a temperature of about 500° C. to about 1000° C., illustratively about 550° C. to about 800° C., e.g., about 550° C. to about 700° C., or e.g., about 600° C. to about 750° C. In various examples, the average reaction temperature within the reactor may be in the range of about 400° C. to about 700° C., illustratively about 425° C. to about 600° C., e.g., about 450° C. to about 550° C., e.g., about 475° C. to about 500° C. Additionally, in some examples, the reactor may be at pressure in the range of about 0.01 MPa to about 10 MPa, illustratively about 0.1 to about 5 MPa, e.g., about 0.1 to about 1 MPa, or, e.g., about 0.05 MPa to about 0.5 MPa, or about 0.01 MPa to about 0.1 MPa. Nonlimiting examples of flow rates and residence times within the riser and reactor are provided elsewhere herein.

In nonlimiting examples in which the feedstock is or includes a renewable lipid feedstock, the reaction(s) performed using the particulate catalyst in the riser, reactor, and/or piping 122" may reduce the amount of oxygen in the lipid feedstock. For example, the intermediate composition may include less than about 70 wt % of an amount of oxygen in the lipid feedstock. Additionally, the reaction(s) performed using the metal oxide catalyst may modify the location(s) of oxygen within the molecules being reacted. For example, at least about 80 wt % of the oxygen in the liquid portion of the intermediate composition may be within ketone groups. In comparison, in some examples, the lipid feedstock substantially may not include any ketone groups.

Additionally, the present catalytic conversion may remove multiple contaminants, thus rendering the intermediate composition safe to bring into contact with any subsequent catalysts for use in generating a renewable fuel. In some examples, the intermediate composition lacks a detectable amount of metal. In some examples, the intermediate composition lacks a detectable amount of phosphorous. In some examples, the intermediate composition lacks a detectable amount of chlorine. The amount (if any) of metal, phosphorous, and/or certain other contaminants may be measured in any suitable manner, such as inductively coupled plasma-mass spectrometry (ICP). In some examples, an organic chloride contaminant level can be determined by X-ray Fluorescence Spectroscopy, e.g., ASTM D7536-09, Standard Test Method for Chlorine in Aromatics by Monochromatic Wavelength Dispersive X-ray Fluorescence Spectrometry. In other examples, chlorine content may be determined using combustion ion chromatography (CIC), a technique in which a sample is burned in an oxygen-containing gas flow, the gas generated (including halogen ions) is absorbed by a solution, and then the halogen content of the solution is quantitatively analyzed using ion chromatography. Additionally, or alternatively, in some examples, chlorine content may be determined using X-ray fluorescence to determine chloride content with a detection limit of about 1 ppm.

When it is described herein that a composition "lacks a detectable amount" of an element, it means that the amount of that element in the composition is approximately at or below than the measurement threshold of the respective instrument being used to measure that element. Of course, different instruments may have different measurement thresholds than one another. In some examples, the instrument has a measurement threshold of about 5 ppm, and the intermediate composition has a concentration of less than about 5 ppm of metal, phosphorous, and/or chlorine. In some examples, the instrument has a measurement threshold of about 1 ppm, and the intermediate composition has a concentration of less than about 1 ppm of metal, phosphorous, and/or chlorine. In other examples, the instrument has a measurement threshold of about 0.5 ppm, and the intermediate composition has a concentration of less than about 0.5 ppm of metal, phosphorous, and/or chlorine. In still other examples, the instrument has a measurement threshold of about 0.1 ppm, and the intermediate composition has a concentration of less than about 0.1 ppm of metal, phosphorous, and/or chlorine.

In nonlimiting examples in which the present systems and methods are used to convert a renewable lipid feedstock into an intermediate composition, further details regarding the intermediate composition now will be provided.

In some examples, the intermediate composition includes a mixture of organic compounds primarily having a boiling point above about 150° C. The renewable fuel intermediate composition may be stored and/or may be further processed in any suitable manner to form a final product (e.g., renewable fuel). Illustratively, method 300 illustrated in FIG. 3 further may include hydroprocessing a fraction of the intermediate composition to aviation fuel. Additionally, or alternatively, method 300 illustrated in FIG. 3 further may include hydroprocessing a fraction of the intermediate composition to renewable diesel fuel. Additionally, or alternatively, method 300 illustrated in FIG. 3 further may include hydroprocessing a fraction of the intermediate composition to renewable naphtha. Additionally, or alternatively, method 300 illustrated in FIG. 3 further may include hydroprocessing a fraction of the intermediate composition to renewable gasoline.

Previously known approaches to hydrotreating lipids typically produce a majority of hydrocarbons in the diesel fuel range with very little in the jet fuel range. However, it has been further discovered that the present systems and methods may be used to produce a renewable fuel intermediate composition that is surprisingly lighter and richer in components in the jet fuel range. Without being bound by a particular theory, it is believed that in the present systems and methods, heavier components of the intermediate composition that have a boiling point that is too high for evaporation under the conditions in the reactor tend to remain in the liquid phase in the reactor until they convert further into lighter products that evaporate in the reactor and are carried out of the reactor in the vapor phase. It is further understood the present systems and methods restructure the carbon chains in the fatty acids of the lipids. In some examples, the intermediate composition is or includes a mixture of essentially non-acidic hydrocarbons and oxygenates, primarily ketones, with chain lengths varying from significantly shorter than the original fatty acid chain length to considerably longer than the original fatty acid chain length. This phenomenon yields a renewable fuel intermediate composition that is particularly useful for producing fuel range products, particularly products in the aviation fuel range.

In some examples, the intermediate composition exiting the reactor may be separated into the following components: 1) renewable fuel gas including (and, in some examples, consisting essentially of) C1 and C2 hydrocarbons with a boiling point range of about 0° C. to about 20° C., 2) a renewable liquefied petroleum gas (LPG) including (and, in some examples, consisting essentially of) C3 and C4 hydrocarbons with a boiling point range of about 20° C. to about 150° C., 3) a renewable intermediate transportation fuel including (and, in some examples, consisting essentially of) hydrocarbons in the range of C5 to C20 with a boiling point range of about 150° C. to about 360° C., and 4) a heavy ends product including (and, in some examples, consisting essentially of) hydrocarbons in the range of C21 to C35 with a boiling point range of about 360° C. to about 490° C. Such separation may be performed, for example, using distillation in a manner such as known in the art.

In some examples, such separation may be used to obtain a liquid portion of the renewable fuel intermediate composition having the following characteristics:

(1) naphtha (boiling point of about 20° C. to about 150° C.) of greater than 10 wt % and less than about 30 wt % in the intermediate composition;

(2) intermediate transportation fuel (boiling point of about 150° C. to about 360° C.) of greater than about 40 wt % and less than about 60 wt % in the intermediate composition; and (3) heavy ends product (boiling point of about 360° C. to about 490° C.) of less than about 30 wt % in the intermediate composition.

In some examples, the liquid portion of the renewable fuel intermediate composition may be further characterized as having greater than 90% of its carbon content being renewable carbon of biological (as opposed to fossil/mineral) origin as measured by standard C14 radiocarbon analysis.

In some examples, the liquid portion of the renewable fuel intermediate composition may be further, or alternatively, characterized as having an oxygen content in the range of 1-4 wt %.

In some examples, the liquid portion of the renewable fuel intermediate composition can be further, or alternatively, characterized as having an NMR branching index of greater than about 14%, wherein the NMR branching index is defined as the integral of the protons in the methyl region of 0.5 to 0.95 ppm as a percentage of the integral of the entire aliphatic proton resonances region of 0.5 to 2.1 ppm.

In some examples, the liquid portion of the renewable fuel intermediate composition may be further, or alternatively, characterized as having about 10 wt % to about 50 wt % of oxygen containing molecules and/or at least about 50 wt % of oxygen-free hydrocarbons.

In some examples, the liquid portion of the renewable fuel intermediate composition can be further, or alternatively, characterized as having more than about 80 wt % of the oxygen in the product being in the form of ketone groups. Additionally, or alternatively, in some examples, the liquid portion of the renewable fuel intermediate composition may be characterized as having and at least about 10 wt % of the oxygen in the form of methyl ketones (Me-C(O)—R).

In some examples, the liquid portion of the renewable fuel intermediate composition can be further, or alternatively, characterized as having a total acid number (TAN) of less than 1.

In one nonlimiting example, an intermediate aviation fuel portion of the liquid renewable fuel intermediate composition that is suitable for further processing into aviation fuel (e.g., jet fuel) may be characterized as:

(1) having greater than 90% of its carbon content being renewable carbon of biological (as opposed to fossil/mineral) origin as measured by standard C14 radiocarbon analysis;

(2) having a freezing point of less than about −15° C.;

(3) having less than about 10 wt % of its content including acyclic isoalkanes; and (4) having greater than about 15 wt %, (e.g., greater than about 20 wt %, or greater than about 30 wt %) of its content being saturated hydrocarbons with one or two rings (i.e., cycloalkanes).

In some examples, the intermediate aviation fuel portion can be further, or alternatively, characterized as a composition in which the fraction of saturated hydrocarbons with one or two rings is at least twice the fraction of saturated acyclic hydrocarbons (i.e., traditional isoalkanes).

In some examples, the intermediate aviation fuel portion can be further characterized as a composition in which the fraction of saturated hydrocarbons with one or two rings is larger than the fraction of saturated acyclic hydrocarbons (i.e., traditional isoalkanes).

As noted above, transportation fuels have to meet certain specifications. The cold flow properties of transportation fuels may be particularly challenging when making renewable fuels from lipid feedstock. For example, lipids may include linear molecular components which, in previously known methods, tend to hydrotreat to predominantly linear products, which may have relatively high pour, cloud, and freeze points. Consequently, renewable fuels produced using previously known methods may need extensive isomerization/isodewaxing to meet the cold flow property specification. The specifications for aviation fuels, in particular, have a relatively low freeze point (i.e., −40° C. for Jet A, −47° C. for Jet A-1, and −60° C. for Jet B).

In some examples, intermediate compositions made using the present systems and methods may be used to produce a hydrotreated renewable fuel composition that is suitable for use as transportation fuel (particularly jet fuel, such as Jet A or Jet A-1). For example, it is expected that when the renewable fuel intermediate composition is hydrogenated, the jet fuel range fraction of the hydrogenated product will have a suitable freezing point. In one nonlimiting example, the hydrotreated renewable fuel composition may be characterized as having:

(1) a carbon content of which at least about 90% is derived from biological origin as determined by carbon-14 presence;

(2) a bromine index less than about 1000;

(3) an oxygen content less than about 1 wt %; and (4) a cycloalkane content having one or two rings, the cycloalkane content including greater than 15 wt %.

In some examples, the hydrotreated renewable fuel composition may be further, or alternatively, characterized as having a jet fuel component that has a freezing point less than about −15° C., or less than about −20° C., or less than about −30° C., or less than about −40° C., or about −40° C., or about −47° C.

In some examples, the hydrotreated renewable fuel composition may be further, or alternatively, characterized as having an n-alkane content of less than about 70 wt %, or less than about 60 wt %.

In some examples, the hydrotreated renewable fuel composition may be further, or alternatively, characterized as having an acyclic isoalkane content of less than about 15 wt %.

In some examples, the hydrotreated renewable fuel composition may be further, or alternatively, characterized as having a cycloalkane content that is at least about twice an acyclic isoalkane content as measured by weight percent of the hydrotreated renewable fuel composition.

In some examples, The hydrotreated renewable fuel composition may be further, or alternatively, characterized as having mono-aromatic components greater than about 2 wt % and less than about 15 wt %.

Additional Comments

While various illustrative embodiments of the invention are described above, it will be apparent to one skilled in the art that various changes and modifications can be made therein without departing from the invention. The appended claims are intended to cover all such changes and modifications that fall within the true spirit and scope of the invention.

What is claimed is:

1. A method of processing a feedstock, the method comprising:

flowing a feedstock into a reactor;

flowing a catalyst into the reactor;

within the reactor, converting the feedstock over the catalyst, at an average reaction temperature, to a product stream;

withdrawing the product stream from the reactor;

withdrawing a first stream of the catalyst from the reactor, wherein the first stream of catalyst is withdrawn from the reactor into a riser comprising a wall;

heating said first stream of the catalyst to a temperature above the average reaction temperature without exposing the catalyst to any air or other oxidants, wherein the first stream of catalyst is heated using heat transfer through the wall; and returning the heated first stream of catalyst to the reactor at a temperature higher than the average reaction temperature, to obtain the average reaction temperature within the reactor.

2. The method of claim 1, wherein the catalyst in the reactor is fluidized.

3. The method of claim 1, wherein the feedstock is directly injected into the riser.

4. The method of claim 1, wherein the feedstock is directly injected into the reactor.

5. The method of claim 1, wherein the first stream of the catalyst is heated using fuel gas.

6. The method of claim 5, wherein the fuel gas comprises a portion of the product stream or a gaseous byproduct of the method.

7. The method of claim 1, further comprising maintaining activity of the catalyst using operations comprising:

withdrawing a second stream of the catalyst from the reactor;

regenerating the catalyst by heating the second stream in the presence of an oxidant to burn off coke from the catalyst; and returning the regenerated catalyst to the reactor.

8. The method of claim 7, wherein regenerating the catalyst generates additional heat that further heats the reactor to the average reaction temperature.

9. The method of claim 7, wherein the regenerated catalyst is returned directly to the reactor.

10. The method of claim 7, wherein the regenerated catalyst is returned indirectly to the reactor.

11. The method of claim 1, wherein the feedstock comprises a renewable feedstock.

12. The method of claim 11, wherein the renewable feedstock comprises a renewable lipid feedstock.

13. The method of claim 12, wherein reaction intermediates are acidic, and wherein the product stream comprises an essentially acid-free vapor-phase composition.

14. The method of claim 13, wherein the reaction intermediates comprise fatty acids, carboxylates, or a mixture of fatty acids and carboxylates.

15. The method of claim 13, wherein the vapor-phase composition has a total acid number (TAN) of less than about 5.

16. The method of claim 13, wherein the vapor-phase composition comprises organic oxygenates comprising ketone groups.

17. The method of claim 16, wherein more than about 70 wt % of the organic oxygenates comprise ketone groups, or wherein more than about 70 wt % of the organic oxygenates in a boiling range of 20-500° C. comprise ketone groups.

18. The method of claim 1, wherein the catalyst comprises a metal oxide catalyst on an oxide support.

19. A system for processing a feedstock, the system comprising:

a reactor;

piping configured to flow a feedstock into the reactor;

piping configured to flow a catalyst to the reactor to convert the feedstock over the catalyst, within the reactor, at an average reaction temperature, to a product stream;

piping configured to withdraw the product stream from the reactor;

piping configured to withdraw a first stream of the catalyst from the reactor;

a riser including a wall, wherein piping withdraws the first stream of catalyst from the reactor into the riser;

a heater configured to heat said first stream of the catalyst using heat transfer through the wall to a temperature above the average reaction temperature without exposing the catalyst to any air or other oxidants; and piping configured to return the heated first stream of catalyst to the reactor at a temperature higher than the average reaction temperature, to obtain the average reaction temperature within the reactor.

20. The system of claim 19, wherein the catalyst in the reactor is fluidized.

21. The system of claim 19, wherein the feedstock is directly injected into the riser.

22. The system of claim 19, wherein the feedstock is directly injected into the reactor.

23. The system of claim 19, wherein the heater uses fuel gas to heat the first stream of the catalyst.

24. The system of claim 23, wherein the fuel gas comprises a portion of the product stream.

25. The system of claim 19, further comprising:

piping configured to withdraw a second stream of the catalyst from the reactor;

a regenerator configured to maintain activity of the catalyst by regenerating the catalyst by heating the second stream in the presence of an oxidant to burn off coke from the catalyst; and piping configured to return the regenerated catalyst to the reactor.

26. The system of claim 25, wherein regenerating the catalyst generates additional heat that further heats the reactor to the average reaction temperature.

27. The system of claim 25, comprising piping to return the regenerated catalyst directly to the reactor.

28. The system of claim 25, wherein the regenerated catalyst is returned indirectly to the reactor.

29. The system of claim 19, wherein the feedstock comprises a renewable feedstock.

30. The system of claim 29, wherein the renewable feedstock comprises a renewable lipid feedstock.

31. The system of claim 30, wherein reaction intermediates are acidic, and wherein the product stream comprises an essentially acid-free vapor-phase composition.

32. The system of claim 31, wherein reaction intermediates comprise fatty acids, carboxylates, or a mixture of fatty acids and carboxylates.

33. The system of claim 31, wherein the vapor-phase composition has a total acid number (TAN) of less than about 5.

34. The system of claim 31, wherein the vapor-phase composition comprises organic oxygenates comprising ketone groups.

35. The system of claim 34, wherein more than about 70 wt % of the organic oxygenates comprise ketone groups; or wherein more than about 70 wt % of the organic oxygenates in a boiling range of 20-500° C. comprise ketone groups.

36. The system of claim 19, wherein the catalyst comprises a metal oxide catalyst on an oxide support.

* * * * *